United States Patent [19]

Morse et al.

[11] Patent Number: 4,965,448
[45] Date of Patent: Oct. 23, 1990

[54] INTERNAL CALIBRATION SOURCE FOR INFRARED RADIATION DETECTOR

[75] Inventors: Paul G. Morse, Westford; Charles C. Petty, Lexington, both of Mass.

[73] Assignee: Honeywell Inc., Minneapolis, Minn.

[21] Appl. No.: 855,851

[22] Filed: Apr. 24, 1986

[51] Int. Cl.$^5$ ............................................. G01M 11/00
[52] U.S. Cl. .................... 250/252.1; 250/330; 250/334
[58] Field of Search ...... 250/252.1, 330, 339, 250/493.1, 495.1, 504 R; 374/1, 2, 126, 124

[56] References Cited

U.S. PATENT DOCUMENTS

| | | | |
|---|---|---|---|
| 3,612,879 | 10/1971 | Ohman | 250/347 |
| 3,694,624 | 9/1972 | Buchta | 219/358 |
| 3,986,384 | 10/1976 | Giorgi | 374/2 |
| 4,280,050 | 7/1981 | Callender et al. | 250/330 |
| 4,378,489 | 3/1983 | Chabinsky et al. | 219/543 |
| 4,383,173 | 5/1983 | Neil et al. | 250/330 |
| 4,433,924 | 2/1984 | Quinn, III | 374/2 |

FOREIGN PATENT DOCUMENTS 608277 5/1980 Japan ................................ 250/330

Primary Examiner—Constantine Hannaher
Attorney, Agent, or Firm—Charles J. Ungemach

[57] ABSTRACT

An internal calibration source for an infrared radiation detector has a low emissivity surface with a high emissivity reticle thereon. An image of the detector is focused on the surface so that it is retroreflected back to the detector. The image is scanned between the high and low emissivity regions during calibration.

14 Claims, 2 Drawing Sheets

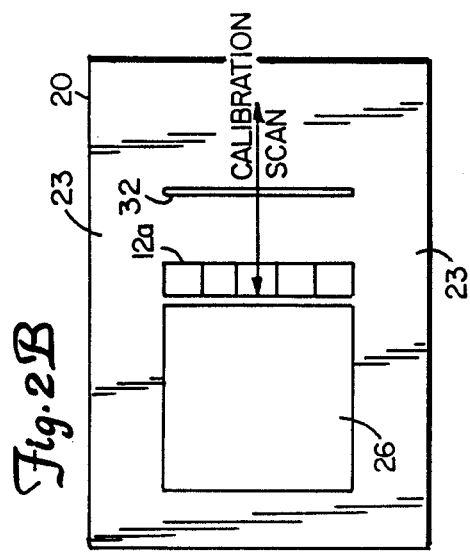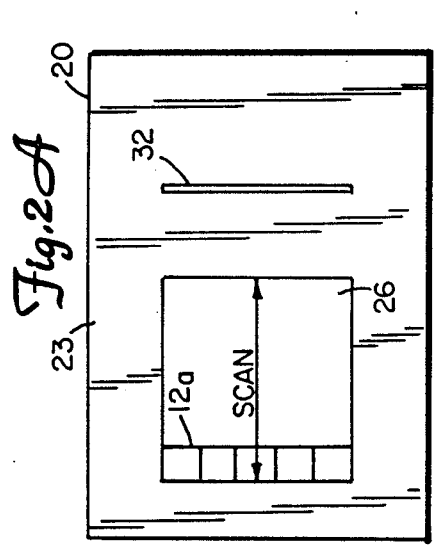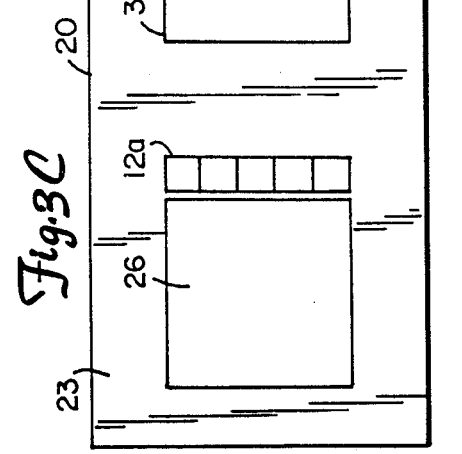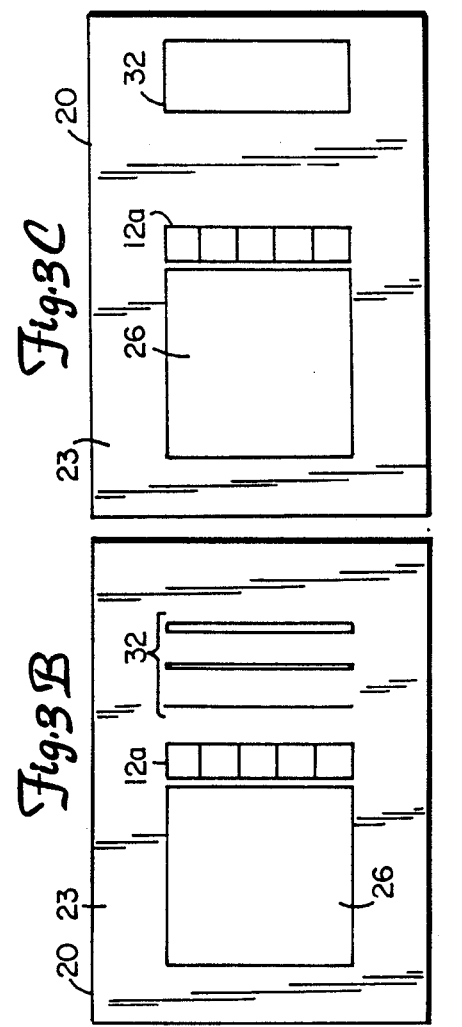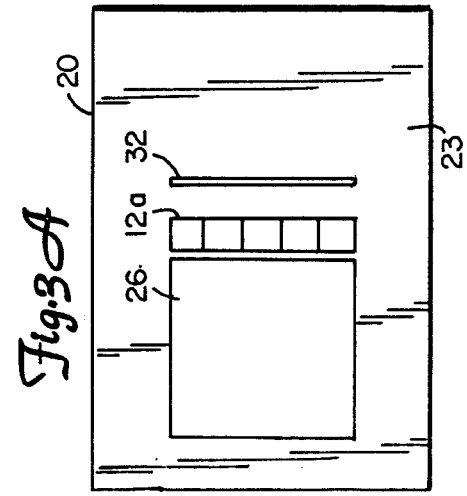

INTERNAL CALIBRATION SOURCE FOR INFRARED RADIATION DETECTOR

BACKGROUND OF THE INVENTION

1. Field or the Invention.

This invention relates to an improved method and apparatus for calibrating scanning infrared detector systems. More particularly, it relates to a simple, stable calibration method and apparatus which does not require close temperature control of the source and which produces repeatable AC calibration signals to the detection system.

2. Description of the Prior Art.

Most spatial scanning and infrared (IR) imaging systems involved in measurement or detection applications require some form of radiometric calibration. Calibration in this context refers to the determination of the relationship (i.e., responsivity) between the incident infrared flux and the output from the infrared sensor. Periodic measurements to reestablish and verify system responsivity are necessary in many applications because the characteristics of the sensors, such as optical efficiency, detector response, optical alignment, offsets and the like vary with time. The calibration process is best accomplished by stimulating the infrared sensor with a known, stable radiometric source which emulates the spatial, spectral, and intensity characteristics of an actual target to the maximum practical extent.

Most infrared spatial scanning and imaging systems use an internal radiometric source for calibration. These calibration sources typically take the forms of heated plates, wires, or resistive elements as, for example, shown in U.S. Pat. Nos. 3,694,624, 4,433,924 and 4,378,489.

These prior art systems have certain limitations. For example, in instances where an AC coupled operation is necessary, these prior art internal calibration sources typically employ a signal chopper, either mechanical or electrical, to produce a fluctuating calibration source within the temporal band pass of the system. Then too, as will be appreciated by those skilled in the art, most of the techniques heretofore used for internal calibration require a close control of the temperature of the calibrating source and the system optics. The emittance of a hot wire typically changes with time and is therefore not suitable for use where long term IR sensor repeatability is a factor.

SUMMARY OF THE INVENTION

An object of this invention is the provision of a novel infrared sensor calibration system suitable for many spatial scanning systems such as FLIRS and missile guidance sensors. Included within this object is the provision of a simple, internal IR calibration source that provides a large repeatable target emulating pulse input to all detectors in a scanning array with sufficient accuracy to monitor long term changes in detector response without close temperature control.

Briefly, this invention contemplates the provision of a high emissivity pattern on a low emissivity (high reflectivity) mirror surface located at an intermediate image plane of a detector or detector array. The surface is offset from the normal field of regard and oriented to retroreflect an image of the detector back to the actual detector area, which is typically held at cryogenic temperature. When the detector is imaged on the reflective portion of the surface, it essentially sees itself in reflection, resulting in a very low level radiance signal. When the detector is imaged onto an adjacent high emissivity area, it sees a radiance level set by the temperature of the surface and its relatively high emissivity. Scanning between the two adjacent surfaces produces an AC calibrating pulse whose characteristics are determined by the width of the high emissivity line and its temperature.

BRIEF DESCRIPTION OF THE DRAWINGS

The following is an explanation of certain specific embodiments of the invention which will make reference to the accompanying drawings, in which:

FIGS. 2A and 2B show a fragmentary view of the calibration plate from the position A—A in FIG. 1 with FIG. 2A showing the position of the detector image in a normal scan operation and FIG. 2B showing the sensor image position during calibration.

FIGS. 3A, 3B, and 3C show respectively three alternative embodiments of a calibration plate in accordance with this invention when viewed from the position A—A of FIG. 1;

DETAILED DESCRIPTION OF THE PREFERRED EMBODIMENTS

Figure 1:
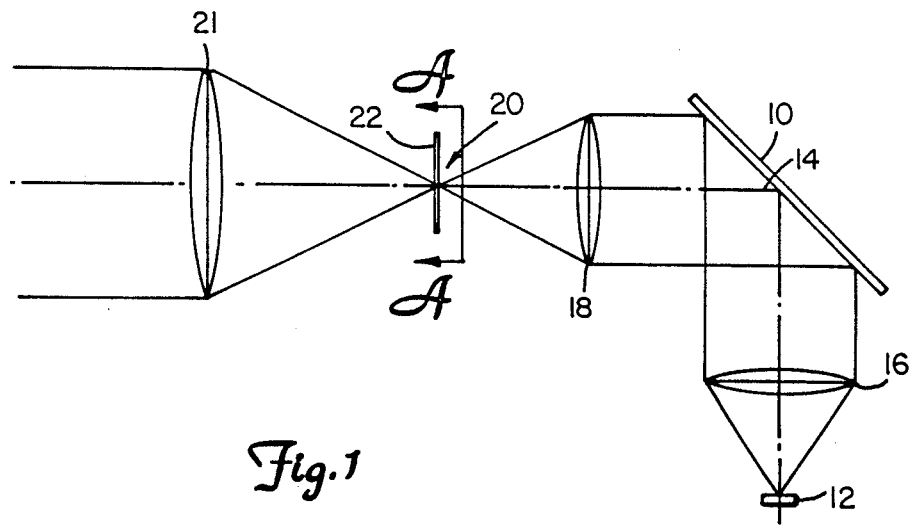
FIG. 1 is a schematic optical diagram of a scanning infrared imaging system employing the teachings of this invention.

Referring now to FIG. 1, a scanning system 10, represented here by an oscillating scanning mirror, scans an image of a detector array 12 through a normal field of regard centered about an optical axis 14. Reimaging optics, represented by a lens 16, and collimating optics, represented by a lens 18, focus an image of the detector 12 at a plane indicated by the general reference numeral 20. Objective optics, represented by a lens 21, forms a collimated scanning beam.

In this illustrative embodiment, the scanning mirror 10 oscillates through a small arc (e.g. ±1.5°) about a nominal 45° orientation with respect to the axis 14. This motion scans an image of the detector over a normal field of regard at the image plane 20. In accordance with the teaching of this invention, a calibration plate or surface 22 is located at the focal plane 20.

As shown more clearly in FIG. 2, the calibration plate 22 has a highly reflective mirror surface 23 and an aperture 26 formed in the plate. This aperture frames a normal field of regard through which the scanning mirror 10 scans an image 12a of the detector 12. It should be noted here that the calibration plate may be either flat or curved to best match the contour of the image plane.

Outside the normal field of regard is a high emissivity pattern 32 on the low emissivity/highly reflective mirror surface 26. The mirror surface and pattern 32 are not in the normal field of regard. But the mirror surface is adjacent to the field aperture and will retroreflect the detector image 12a back to the area of detector 12 when the scanning mirror 10 is biased to an off-axis calibration position. The high emissivity reticle pattern 32 comprises a black groove in the mirror surface which subtends the full length of the projected detector array image 12a.

To calibrate, the scanning mirror 10 is biased off axis to project an image of the detector array outside of the normal field of regard at the image plane 12 and scan the image of the detector array back and forth across the high emissivity reticle 34. For example, in biasing the mirror 10 for calibration, it would be rotated in a clockwise direction through an arc of approximately 3° and scanned back and forth about this nominal position ±0.7°. The position image of the detector array relative to the reticle in the calibration mode is shown in FIG. 2B at one end of the scan.

In operation, when the detector image 12a is on the mirror surface, the detector 12 essentially sees itself in a reflection resulting in a very low radiance input to the detector. It will be appreciated that the detector 12 is at a cryogenic temperature. When the detector array is imaged onto the adjacent high emissivity area 32 it receives a radiance input determined by the temperature of the plate 20 and the relatively high emissivity of the black body strip 32. The resulting contrast or radiance difference is quite large. Detector 12 produces an AC output pulse in response to a linear scanning motion of the sensor image across the reticle. With a constant scanning rate, the amplitude of the pulse and its AC characteristics are determined by the width of the high emissivity line 32 and its temperature.

To emulate the temporal character of an unresolved point target, the line width should be somewhat less than the image width of the detector array. To emulate a resolved target signal, the line width should be greater than the detector image width. These two situations are illustrated in FIGS. 3A and 3B respectively.

It should be noted that because of the high contrast ratio inherent in this calibration method a large signal amplitude can be generated even though the calibration plate temperature is at the ambient temperature of its location. Temperature control of the calibration plate is not necessary, although in certain applications some control may be desirable. In addition, absolute calibrating measurements can be obtained by providing a temperature sensor on the calibrator plate and for the intervening optical assembly.

Referring now to FIG. 3C, a series of lines 32 of varying width and/or varying emissivity will produce a series of signal pulses of a different amplitude suitable for a radiometer linearity calibration. In general, it should be noted that various calibration patterns can be used to produce a wide range of AC outputs with characteristics suitable for a wide range of sensor calibration functions.

Figure 4:
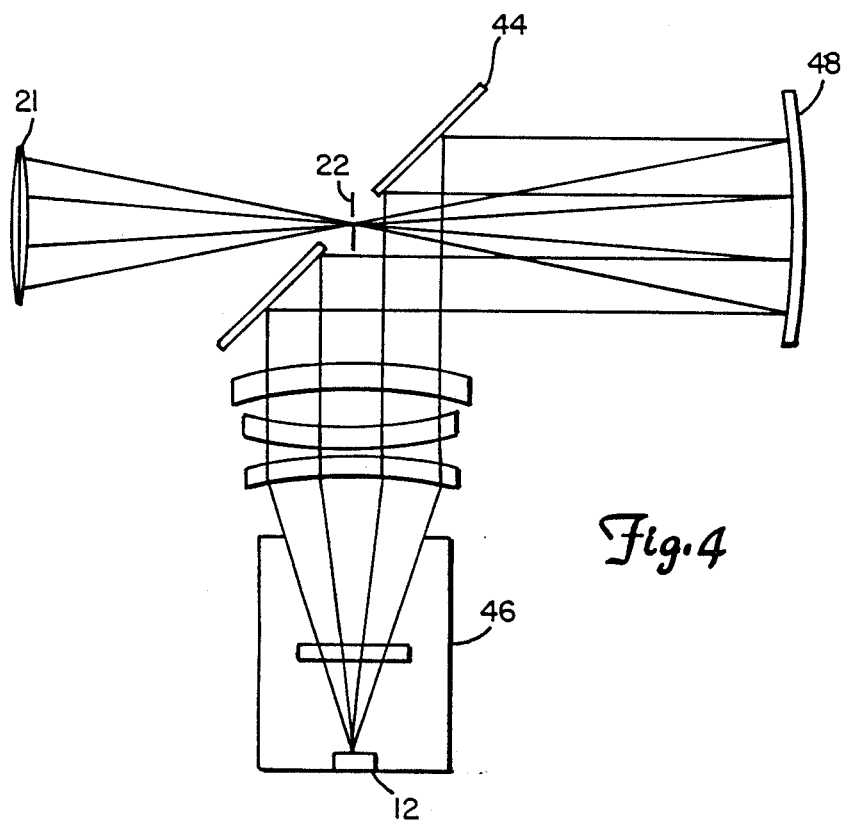
FIG. 4 is a partial schematic diagram and a partial optical diagram of another embodiment of an infrared scanning system applying the teachings of this invention.

FIG. 4 shows the application of a calibration surface for another IR scanning system. Here a calibration plate 22 is located in an aperture in a scanning mirror 44. As explained in connection with FIG. 1, the scanning mirror 44 scans an image of the detector array 12 through a normal field of regard. A dewar 46 keeps the detector array 12 at a cryogenic temperature and a Cassegrian objective lens 48 focuses an image of the detector at the plane where the calibration plate 22 is located. As previously explained, there is an aperture 26 in the plate 22 along the principle optical axis of the system. This aperture frames the normal field of regard. The surface of the plate is highly reflective. There is a highly emissive reticle closely adjacent to the aperture but outside the normal field of regard. To calibrate the system mirror 44 is biased to scan across the reticle.

The operation of the system is essentially the same as that previously described in connection with FIGS. 1 and 2.

It should be noted that the calibration plate has been shown in its perfected embodiment as a plate with an aperture framing the normal field of regard. This design provides an optical baffle. However, the calibration surface may be comprised of a mirrored surface with a black-body reticle entirely on one side of the principle optical axis so long as it is outside the field of normal regard and at a position where the scanning optics can be biased to retroreflect an image of the sensor from the mirrored surface in the calibration mode.

What is claimed is:

1. An internal calibration source for an infrared radiation detector which scans a normal field of regard;
    a low emissivity surface with a high emissivity reticle thereon;
    means to focus an image of said detector on said surface so that said image is retroreflected back to said detector; and
    means to scan said image between said high and low emissivity region of said surface.

2. An internal calibration source as in claim 1 wherein said surface is on a plate which has an aperture framing said field of regard.

3. An internal calibration source as in claim 2 wherein said reticle is a line which in length subtends the image of said detector and in width is less than the width of said detector.

4. An internal calibration source as in claim 2 wherein said reticle is a line which in length subtends said image and in width is greater than the width of said image.

5. An internal calibration source as in claim 1 wherein said reticle is a line which in length subtends the image of said detector and in width is less than the width of said detector.

6. An internal calibration source as in claim 1 wherein said reticle is a line which in length subtends said image and in width is greater than the width of said image.

7. An internal calibration source for an infrared radiation detector comprising in combination;
    means for scanning an image of said detector;
    means for driving said scanning means to scan said image through a normal field of regard in response to a scan drive input;
    a low emissivity surface with a high emissivity reticle thereon disposed outside said normal field of regard to retroreflect reflect an image of said detector back to said detector; and
    said driving means driving said scanning means to scan said image of said detector between said low emissivity surface and said high emissivity reticle in response to a calibration drive input.

8. An internal calibration source as in claim 7 wherein said surface is on a plate which has an aperture framing said field of regard.

9. An internal calibration source as in claim 7 wherein said reticle is a line which in length subtends the image of said detector and in width is less than the width of said detector 10. An internal calibration source as in claim 2 wherein said reticle is a line which in length subtends said image and in width is greater than the width of said image.

11. An internal calibration source for an infrared radiation detector comprising in combination;
    means for scanning an image of said detector;

means for driving said scanning means to scan said image through a normal field of regard in response to a scan drive input;

means including said scanning means for focusing an image of said detector at an internal focal plane;

a low emissivity surface with a low emissivity reticle thereon disposed outside said normal field of regard to retroreflect an image of said detector back to said detector; and said driving means driving said scanning means to scan said image of said detector between said high emissivity surface and said low emissivity reticle in response to a calibration drive input.

12. An internal calibration source as in claim 11 wherein said surface is on a plate which has an aperture framing said field of regard.

13. An internal calibration source as in claim 11 wherein said reticle is a line which in length subtends the image of said detector and in width is less than the width of said detector 14. An internal calibration source as in claim 11 wherein said reticle is a line which in length subtends said image and in width is greater than the width of said image.

* * * * *

UNITED STATES PATENT AND TRADEMARK OFFICE
CERTIFICATE OF CORRECTION

PATENT NO. : 4,965,448

DATED : October 23, 1990

INVENTOR(S) : Paul G. Morse and Charles C. Petty

It is certified that error appears in the above-identified patent and that said Letters Patent is hereby corrected as shown below:

Column 4, line 49, "retroreflect reflect" should read -- retroreflect --.

Column 5, line 6, "low" (second occurrence) should read -- high --. Line 11, "high" should read -- low --.

Column 6, line 1, "low" should read -- high --.

Signed and Sealed this

Twenty-fifth Day of February, 1992

Attest:

HARRY F. MANBECK, JR.

*Attesting Officer*  *Commissioner of Patents and Trademarks*